March 21, 1939.   S. A. SCHELKUNOFF   2,151,157

GUIDED ELECTROMAGNETIC WAVE TRANSMISSION

Filed Oct. 31, 1936   3 Sheets-Sheet 1

INVENTOR
S. A. SCHELKUNOFF
BY H. A. Burgess
ATTORNEY

March 21, 1939.   S. A SCHELKUNOFF   2,151,157
GUIDED ELECTROMAGNETIC WAVE TRANSMISSION
Filed Oct. 31, 1936   3 Sheets-Sheet 2
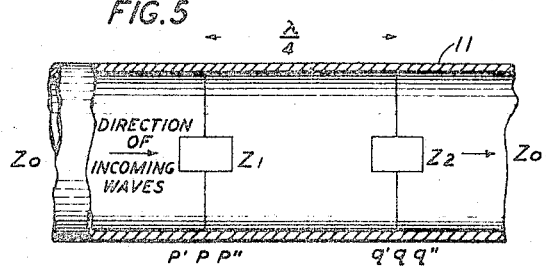
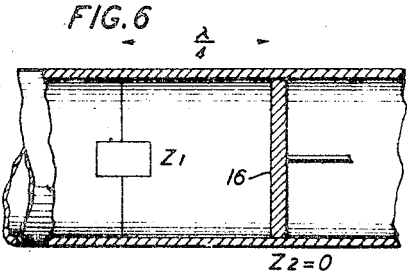
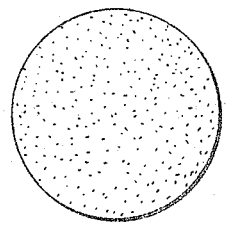
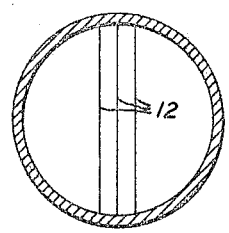
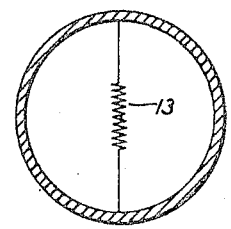
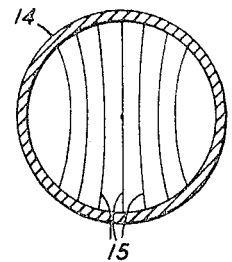
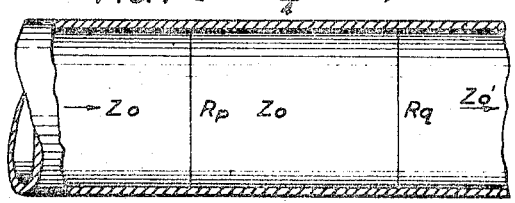
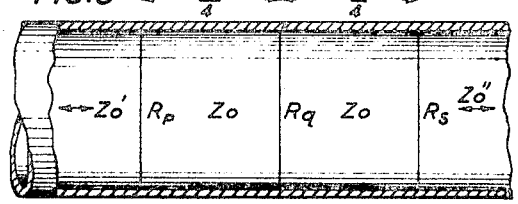
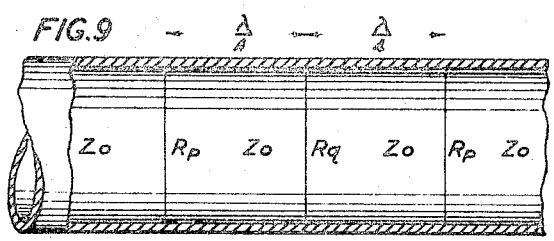
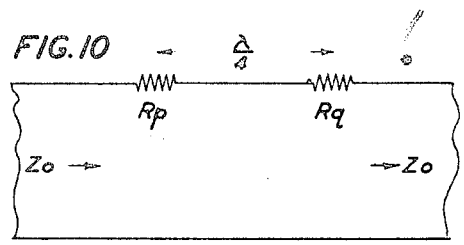
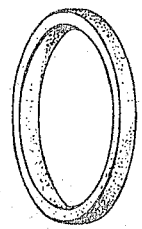
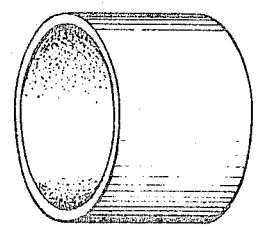
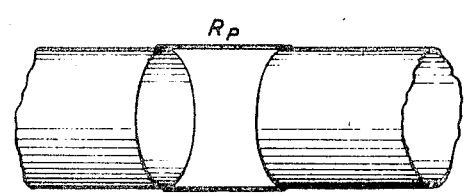
INVENTOR
S. A. SCHELKUNOFF
BY
/s/ H. A. Burgess
ATTORNEY March 21, 1939.  S. A. SCHELKUNOFF  2,151,157
GUIDED ELECTROMAGNETIC WAVE TRANSMISSION
Filed Oct. 31, 1936  3 Sheets-Sheet 3
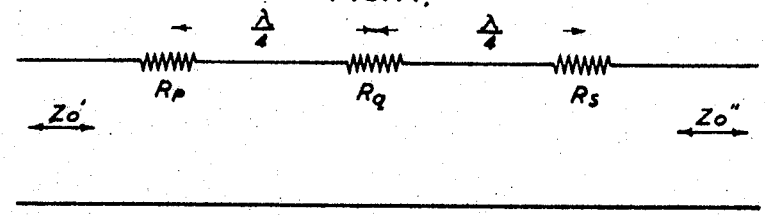
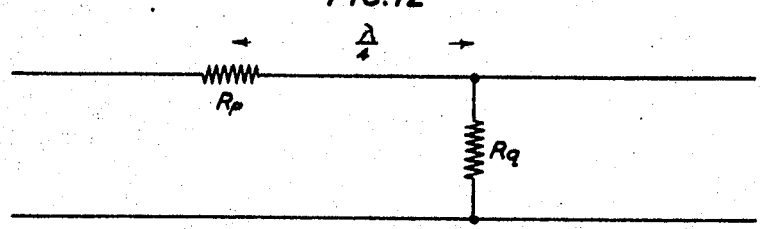
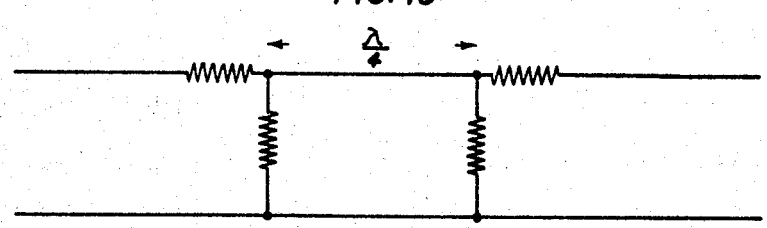
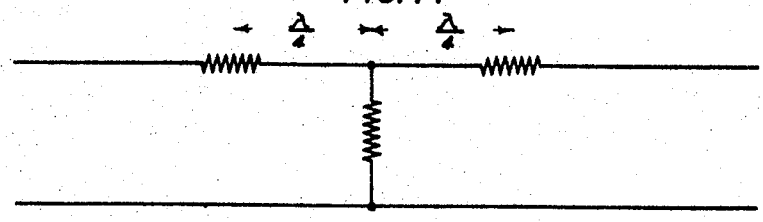
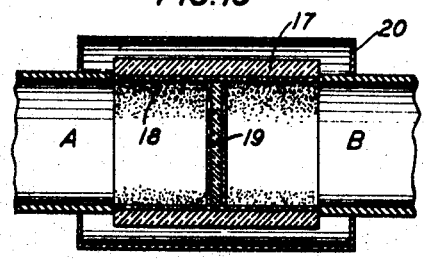
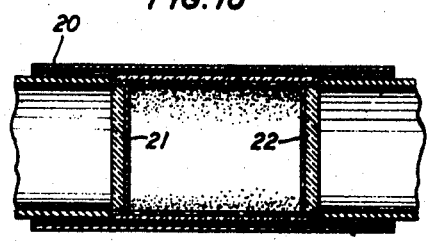
INVENTOR
S. A. SCHELKUNOFF
BY
ATTORNEY Patented Mar. 21, 1939

2,151,157

UNITED STATES PATENT OFFICE 2,151,157

GUIDED ELECTROMAGNETIC WAVE TRANSMISSION

Sergei A. Schelkunoff, New York, N. Y., assignor to Bell Telephone Laboratories, Incorporated, New York, N. Y., a corporation of New York Application October 31, 1936, Serial No. 108,575

26 Claims. (Cl. 178—44)

This invention relates to guided electromagnetic wave transmission and more specifically to attenuators and terminations for wave guides.

One of its objects is to devise means for so terminating a wave guide that there will be no reflection at the termination.

Another object is to provide attenuation of any desired degree at a given point in a wave guide and to devise attenuating structures of such a nature as to obtain for a wave progressing in one direction any desired degree of attenuation, while at the same time maintaining impedance matching at that point so that no reflection occurs back into the guide from which the incident wave came.

Still a further object is to provide such attenuating means with impedance matching looking in either direction from the junction of sections of guides of the same or different characteristic impedances.

The invention will be better understood by reference to the following specification and the accompanying drawings in which:

Fig. 5 is a diagram showing means for attenuating a guided wave through the use of shunt impedance elements;

Figs. 5A to 5D show different forms which the shunt impedance elements of Fig. 5 may take;

Fig. 6 is a special case of Fig. 5 leading to a desired form of termination;

Figs. 7 to 9 are extensions of the arrangement of Fig. 5, the attenuating impedances being shunt elements;

Fig. 10 shows an attenuating arrangement of two series elements;

Figs. 10A to 10C illustrate a form which series resistances suitable for my invention may take;

Fig. 11 is an extension of Fig. 10; and

Figs. 12 to 16 are various combinations of the previous arrangements.

Figure 1:
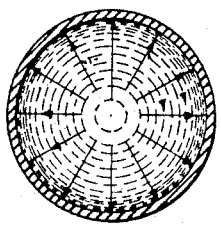
Figs. 1 to 4A are diagrammatic transverse and longitudinal sections of a wave guide showing characteristic wave types therein.
Figure 1A:
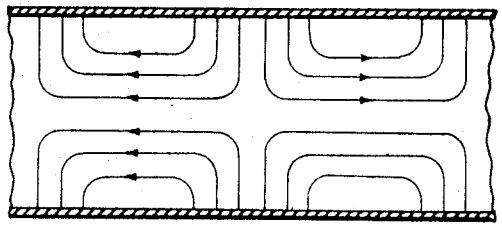
Figure 2:
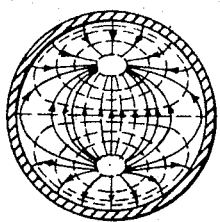
Figure 2A:
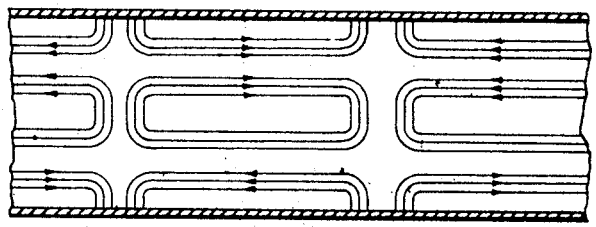
Figure 3:
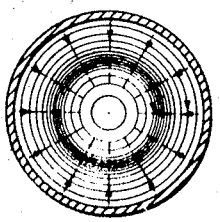
Figure 3A:
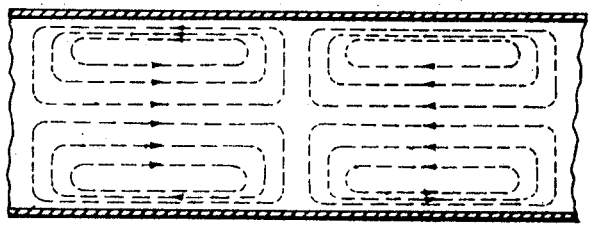
Figure 4:
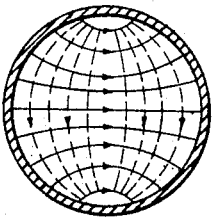
Figure 4A:
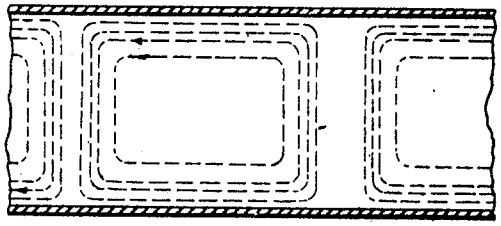

Figs. 1 to 4A refer specifically to the type of guided waves disclosed in an application of G. C. Southworth, Serial No. 661,154, filed March 16, 1933, which matured into Patent 2,129,711, September 13, 1938, and in my copending application Serial No. 56,959, filed December 31, 1935, and they show the general form of the electric and magnetic fields in some of the simpler types of such waves. While the invention is largely described in terms of guides for such waves, it is not restricted to them but is applicable to other forms of waves and wave guides, such as the so-called coaxial guide comprising two coaxial conductors with conduction currents flowing on the inner surface of the outer conductor and the outer surface of the inner conductor.

An important feature of my invention resides in the recognition of the fact that great simplification is introduced in the physical behavior of the devices shown if the various impedance elements are spaced with respect to each other by amounts simply related to the wave-length of the wave being propagated. This simplification becomes particularly apparent on the application of electric circuital theory to such cases as will be considered.

Referring, for example, to Fig. 5, there is shown a hollow guide 11, comprising a metallic pipe, which has a characteristic impedance represented by $Z_0$. It is desired to attenuate an incoming wave, shown as traveling towards the right, to any desired degree and in a manner which will preclude any reflection back into the incoming guide. To this end as shown schematically in Fig. 5 there are introduced two impedances, $Z_1$ and $Z_2$, which may be tight-fitting uniform discs. In general, these impedances will be substantially pure resistances so that they are absorbers of power. They may, however, possess reactance either incidentally or intentionally introduced. In the form of discs of resistive material they will have effective resistances peculiar to the particular type of waves traveling in the guide, appropriate formulae for these being given in my copending application supra. As power absorbing arrangements, these impedances may take on a variety of forms. Thus Fig. 5A shows a disc which may be of appreciable thickness and of high resistive material, such as carbon or metal oxides. They may also very conveniently take the form of a disc of insulating material, such as glass, on which there has been deposited by sputtering or otherwise a thin film of metal, the deposit being of such thickness as to give a desired effective resistance. When introduced into the guide such a disc serves as a shunt resistance.

In the case of transverse electric waves the shunt elements may also take other forms as indicated, for example, in Fig. 5B where one or more wires are arranged in one configuration or another, here shown as three substantially diametral wires 12. Again, as in Fig. 5C, they may take on the form of a diametral wire with a lumped resistance 13 at the middle or other portion of the wire. Still again, as in Fig. 5D, they may take the form of a circular frame 14 supporting a plurality of wires 15 shaped approximately to follow the electric lines of force set up by the wave. These and other forms of shunt resistances are described in some detail in the patent application of King and Bowen, Serial No. 62,616, filed February 6, 1936.

In order to make the theory of my invention clear, the impedance looking to the right from any point will be indicated by a subscript appropriate to that point. Thus, in Fig. 5 where two shunt impedance elements, $Z_1$ and $Z_2$, are represented at points $p$ and $q$, respectively, and where $p'$ and $p''$ identify points just to the left and right, respectively, of point $p$, and $q'$ and $q''$ identify points similarly related to point $q$, the impedance $Z_q$, as seen from the point $q'$ looking to the right, consists of the impedance of the element $Z_2$ in parallel with the characteristic impedance $Z_0$ of the guide from thereon and one readily obtains the relation $$Z_{q'} = \frac{Z_0 Z_2}{Z_0 + Z_2}$$

For the purpose of simplification in the practice of my invention the impedance $Z_1$ and $Z_2$ will be spaced one-quarter wave-length apart as indicated in Fig. 5. Under these conditions it can be readily shown that the impedance looking to the right from the point $p''$ is $$Z_{p''} = \frac{Z_0^2}{Z_{q'}} = Z_0 \frac{(Z_0 + Z_2)}{Z_2}$$

Also it readily appears then that $$Z_{p'} = \frac{Z_1 Z_{p''}}{Z_1 + Z_{p''}} = \frac{Z_1 Z_0 (Z_2 + Z_0)}{Z_1 Z_2 + Z_0 (Z_0 + Z_2)}$$

If now it is arranged that $Z_{p'}$ shall be equal to $Z_0$, which is the characteristic impedance of the incoming guide looking from $p'$ towards the left, there will be no reflection from the structure, that is, there will be impedance matching at the point $p'$ for waves coming from the left. On placing $Z_{p'} = Z_0$ in the last equation it reduces to $$Z_1 - Z_2 = Z_0 \quad (1)$$

From this equation it will be seen that if the characteristic impedance of the guide is reactive then it is necessary that the shunt elements shall also be reactive but there is wide latitude within the terms of Equation (1) as what two particular values shall be given to $Z_1$ and $Z_2$. $Z_1$ and $Z_2$ may be reactive so long as the reactive components balance out. Also they may be pure resistances in themselves and this is the condition which is frequently to be preferred, if feasible. On this basis then, and hereinafter throughout this specification, the attenuating impedances will, in general, be assumed to be purely resistive, and in that case Equation (1) takes the form $$R_p - R_q = Z_0 \quad (2)$$

where $R_p$ and $R_q$ are the values which $Z_1$ and $Z_2$ then take.

It will be recognized, of course, that the characteristic impedance $Z_0$ of the given guide is ordinarily a function of the frequency and, if one is to transmit a wave of a different frequency, not only must the shunt resistances be changed so that the difference between them is equal to the new characteristic impedance but also the spacing between the elements must be altered to conform to the new quarter wave-length. The adjustment, however, at one given frequency is not highly critical and thus for a message band of reasonable width the adjustment may be made for an intermediate or average wave-length.

By application of the usual circuital theory to this problem one can readily calculate the amount of attenuation. Such considerations show that the ratio $K$ of the absorbed power to the input power in my attenuator is given by $$K = \frac{Z_0(R_p + R_q)}{R_p^2} = 1 - (R_q/R_p)^2 \quad (3)$$

It will be observed that in Equation (1), $Z_2$ may be zero, that is, $Z_2$ may be a short circuit. This condition is obtained most readily by making $Z_2$ a conducting piston 16, as shown in Fig. 6, and this is spaced one-quarter wave-length from the impedance $Z_1$. In this case the structure is a terminating impedance that will match the impedance of the wave guide and there will be no reflected component, as borne out by Equation (3). If $Z_2$ or $R_q$ is not equal to zero, the structure will be an attenuator with a component which is transmitted.

While the invention thus far has been described in terms of a metallic pipe guide, it is to be understood that it may be used for other types of wave guides and that the equations derived hold equally well for such types as well as for all kinds of pure waves including those transmitted by a pair of parallel wires or by a pair of coaxial conductors. By a pure wave is meant a wave having its equiphase surfaces perpendicular to the direction in which it travels, that is, a wave whose transmission is governed by equations identical with the equations of ordinary transmission lines.

For many forms of shunt resistances and in particular for those comprising wires as in Figs. 5B to 5D, the elements will commonly have a small reactive component in addition to the resistive components. These reactance unbalances can and should be tuned out by properly changing the separation between the shunt elements. Thus, the optimum distance between the elements will not be exactly $$\frac{\lambda}{4}$$

and the section between the two shunt elements will have a negative or positive reactance depending upon whether the spacing is greater or less, respectively, than $$\frac{\lambda}{4}$$

In fact, when $Z_1 = R_p + iX_p$ and $Z_2 = R_q + iX_q$, the following relation should obtain for impedance matching:

$$\tan \frac{2\pi l}{\lambda} = \frac{R_p + R_q}{X_q - X_p} = \frac{X_p + X_q}{R_p - R_q - Z_0} \quad (4)$$

In the description of Fig. 5 it has been assumed that the characteristic impedance of the guide is the same throughout its length. It may very well occur, however, that the guide coming up to the attenuation point has one characteristic impedance $Z_0$ and that going out on the other side has a different characteristic impedance $Z_0'$ as indicated in Fig. 7. Any desired attenuation with the retention of impedance matching may, however, still be obtained for one-way transmission. On using the same method of treatment as in Fig. 5 one obtains the following relationships:

$$Z_{q'} = \frac{R_q Z_0}{R_q + Z_0}, \quad Z_{p''} = \frac{Z_0'^2}{Z_{q'}}, \quad Z_{p'} = \frac{R_p Z_{p''}}{R_p + Z_{p''}}$$

For impedance matching $Z_{p'} = Z_0$ and on combining and simplifying the above equations one obtains the relationship $$R_q = \frac{Z_0 Z_0'(R_p - Z_0)}{Z_0'^2 - R_p(Z_0 - Z_0')} \quad (5)$$

It will be noted that Equation (2) is a special case of Equation (5) as appears on making $Z_o'=Z_o$.

In the arrangements described above the conditions are given for impedance matching for waves coming from one direction. The system, however, will not necessarily be matched for waves coming from the other direction. To obtain the condition of matching for both directions it is generally necessary to have an additional degree of freedom, and this can be obtained by using three shunt elements, reactive or non-reactive. Such an arrangement is shown in Fig. 8 in which the special case of pure resistive shunts are shown. The general case is illustrated in which the guide from the one side has the characteristic impedance $Z_o'$ and the guide from the other side has the characteristic impedance $Z_o''$, whereas the sections between the shunt elements have the characteristic impedance $Z_o$. Because of the great simplification in the physical behavior of the arrangement the spacing between the successive elements is again made a quarter wave-length.

Usually the more specific case would be of interest in which all the guide sections have the same characteristic impedance $Z_o$ as illustrated in Fig. 9. The situation is then simplified by the symmetry which occurs in that the two outside shunt elements have equal values. The derivation of the relationships for the case of Fig. 9 reduces to:

$$R_p(R_p-2R_q)=Z_o^2 \quad (6)$$

In the description thus far the attenuators described have been obtained by the use of shunt elements. Attenuation may, however, be equally well obtained by use of series elements. Such an arrangement is shown schematically in Fig. 10 where again the simplification in the physical behavior characteristic of a quarter wave-length spacing or odd multiple thereof is utilized. For this case of Fig. 10 the following relationships may be noted:

$$Z_q'=Z_o+R_q;\ Z_p''=\frac{Z_o^2}{Z_q'}=\frac{Z_o^2}{Z_o+R_q};\ Z_p'=R_p+Z_p''$$

To obtain impedance matching for waves propagated from the left one places $Z_p'=Z_o$. Substitution of this value in the relationships above immediately yields the condition for matching:

$$Z_o(R_q-R_p)=R_pR_q \quad (7)$$

In this case, as in the previous ones, on prescribing the amount of attenuation the values to be assigned to $R_p$ and $R_q$ are uniquely specified.

The above-described attenuator acts in the general case with impedance matching in one direction only. In order to design an attenuator with impedance matching in both directions it is generally necessary to use three series resistances as shown in Fig. 11 and the relationship between the series elements may be obtained in the same manner as for Fig. 10. For a symmetric system in which the guides in both directions have the same characteristic impedance the attenuator becomes symmetric, that is, $R_s$ takes on the same value as $R_p$.

The physical form of the series attenuator elements will depend on the type of guide used. If the guide is a hollow one then the series resistance may be made in the form of short sections of pipe of resistive material and of the same cross-section as the guide as illustrated in Fig. 10A. Another convenient form is a cylindrical pipe of insulation, such as glass, which has been sputtered with some conductive material on the inner surface as shown in Fig. 10B. Still another form would consist of two or more longitudinal wires joining the two guide sections as in Fig. 10C. In that case it would be desirable to have a shield such as shown in Fig. 16. Numerous other forms of resistors suitable for these series elements will suggest themselves to those skilled in the art.

Other types of attenuators where the principle of quarter wave spacing is utilized can be designed by arranging series and shunt elements in various combinations and these may be held available in one form or another for ready application to any type of network problem which presents itself.

For example, Fig. 12 shows the combination of a series resistance $R_p$ and a shunt resistance $R_q$ spaced one-quarter wave-length apart. In this case the condition for matching is $R_pR_q=Z_o^2$.

Fig. 13 shows the combination of a series and shunt resistance at one point and the combination of a shunt and a series resistance spaced one-quarter wave-length apart, the whole constituting an arrangement simulating a T-network.

Fig. 14 shows the combination of two such sets as that of Fig. 12, namely, a series element, a shunt element one-quarter wave-length beyond it, and one-quarter wave-length still further another series element.

Still other types of attenuator units may be devised corresponding in many respects to networks now familiar in the wire line transmission art. Thus Fig. 15 shows two guide sections coming in at A and B joined together by an H type of attenuator. This latter may comprise a glass cylinder 17 of the same cross-section as the wave guide and sputtered with a suitable deposit 18 of conductor on the inner surface to provide series resistance. At the mid-point of this cylinder a shunt element, which may be in the form of a sputtered disc 19 is introduced. By proper adjustment of the series and shunt resistances any desired degree of attenuation may be obtained.

In the case of such an arrangement as that of Fig. 15 the introduction of the non-conducting cylinder, causing a break in the guide, would give rise to a leakage of power. Such leakage, however, may be prevented by having a metal conducting cylinder 20 enclosing the non-conducting cylinder and extending over to the ends of the guides. The diameter of this enclosing cylinder and its length may be such as to make this space an anti-resonant chamber for the wave-length to be propagated.

By a somewhat similar arrangement shown in Fig. 16 the equivalent of a $\pi$-type of network is obtained. In Fig. 16 two end shunt elements 21 and 22 are introduced instead of one shunt element in the middle as in Fig. 15. The same type of anti-resonant shield 20 may also be provided.

In many cases it is desirable that the attenuators of Figs. 15 and 16 shall be substantially aperiodic. This can be obtained by making the length of the inserted non-conducting sleeve short in comparison with the wave-length to be propagated.

It is not necessary that the shielding cylinder shall be an anti-resonant chamber. This shield may be rendered aperiodic as shown in Fig. 16 by arranging that it shall be quite long as compared with a wave-length and that its internal diameter shall be but slightly larger than the guide over which it is slipped. The shield may be insulated with respect to the guide or not. If it is insulated it would tend more readily to aperiodicity.

What is claimed is:

1. An electromagnetic wave guide system comprising a guide and means for terminating the guide in its characteristic impedance, said means consisting of a plurality of energy absorbing impedances spaced apart along the guide at intervals simply related to the wave-length of the waves to be propagated.

2. An electromagnetic wave guide system comprising a guide and means for terminating the guide in its characteristic impedance, said means consisting of a plurality of resistive impedance elements, spaced along the guide at an interval equivalent to a quarter wave-length of the waves to be propagated.

3. In an electromagnetic wave guide system comprising a guide with a characteristic impedance for guided waves, means for attenuating the waves being propagated in said guide, said means comprising impedance elements spaced apart along the guide at intervals simply related to the wave-length of the waves to be propagated.

4. In an electromagnetic wave guide system comprising a guide with a characteristic impedance for guided waves, means for attenuating the waves being propagated in said guide, said means comprising impedance elements spaced along the guide at intervals of one-quarter wave-length of the waves to be propagated.

5. In an electromagnetic wave guide system comprising a guide with a characteristic impedance for guided waves, means for attenuating the waves being propagated in said guide, said means comprising impedance elements spaced along the guide at intervals of one-quarter wave-length of the waves to be propagated, and of such magnitudes as to give impedance matching for waves between the guide proper and the portion containing the attenuating impedances.

6. In an electromagnetic wave guide system comprising a guide with a characteristic impedance for guided waves, means for attenuating the waves being propagated in said guide, said means comprising energy absorbing elements spaced apart along the guide at intervals simply related to the wave-length of the waves to be propagated.

7. In a wave guide system comprising a guide with a characteristic impedance for guided waves, means for attenuating the waves being propagated in said guide, said means comprising energy absorbing elements spaced along the guide at intervals of one-quarter wave-length of the waves to be propagated.

8. In a wave guide system comprising a metallic pipe guide with a characteristic impedance for guided electromagnetic waves, means for attenuating the waves being propagated in said guide, said means comprising resistance elements spaced along the guide at intervals of one-quarter wave-length of the waves to be propagated.

9. In a wave guide system comprising a metallic pipe guide with a characteristic impedance for guided waves, means for attenuating the waves being propagated in said guide, said means comprising resistance elements spaced along the guide at intervals of one-quarter wave-length of the waves to be propagated, and of such magnitudes as to give impedance matching for waves between the guide proper and the portion containing the attenuating impedances.

10. In a dielectric wave guide system comprising a dielectric guide, means for attenuating the waves being propagated, said means comprising impedance elements spaced along the guide at intervals simply related to the wave-length of the waves to be propagated and of such magnitude as to yield impedance matching looking into the portion occupied by the impedance elements from either end.

11. In a wave guide system comprising a hollow guide, means therein for attenuating the waves being propagated, said means comprising shunt impedance elements spaced along the guide at intervals simply related to the wave length of the waves to be propagated and of such magnitude as to yield impedance matching looking into the portion occupied by the impedance elements from either end.

12. In an electric wave guide system comprising a guide, means for attenuating the waves being propagated, said means comprising series resistive impedance elements spaced along the guide at intervals simply related to the wave-length of the waves to be propagated and of such magnitude as to yield impedance matching looking into the portion occupied by the impedance elements from either end.

13. In a system comprising a wave guide and means for generating for propagation in said guide waves of a character such that there is a cut-off frequency related to a transverse dimension of said guide, means for attenuating the waves being propagated, said means comprising resistance elements in shunt spaced along the guide at intervals simply related to the wave-length of the waves to be propagated and of such magnitude as to yield impedance matching looking into the portion occupied by the impedance elements from either end.

14. In a system comprising a metallic pipe guide, means for attenuating the waves being propagated, said means comprising resistance elements in series spaced along the guide at intervals simply related to the wave-length of the waves to be propagated and of such magnitude as to yield impedance matching looking into the portion occupied by the impedance elements from either end.

15. In a dielectric wave guide system comprising two dielectric guides with different characteristic impedances, means for joining the two guides of different characteristic impedance but with impedance matching looking in either direction comprising a plurality of impedances at the junction point spaced one-quarter wave-length apart for the wave-length to be propagated.

16. In a wave guide system comprising two wave guides with different characteristic impedances, means for joining the two guides of different characteristic impedance with attenuation but with impedance matching looking in either direction comprising three resistances at the junction point spaced one-quarter wave-length apart for the wave-length to be propagated.

17. In a wave guide system comprising two wave guides with different characteristic impedances, means for joining the two guides of different characteristic impedance but with impedance matching looking in either direction comprising three resistances in series at the junction point spaced one-quarter wave-length apart for the wave-length to be propagated.

18. In an electromagnetic wave guide system comprising a guide with a characteristic impedance $Z_o$, means for attenuating the waves being propagated, said means comprising two shunt resistances $R_p$ and $R_q$ spaced substantially one-quarter wave-length apart and of such magnitude that $R_p - R_q = Z_o$.

19. In an electromagnetic wave guide system comprising a guide with a characteristic impedance $Z_o$, means for attenuating the waves being propagated, said waves comprising two series resistances $R_p$ and $R_o$ spaced substantially one-quarter wave-length apart and so related that $R_p\ R_q = (R_q - R_p) Z_o$.

20. In an electromagnetic wave guide system, a guide, means for attenuating the waves being propagated, said means comprising a series and a shunt resistance followed by a shunt and a series resistance spaced one-quarter wave-length therefrom.

21. In a wave guide system, a wave guide, means for propagating through said guide electromagnetic waves of such character that propagation is possible only above a certain frequency, means for attenuating the waves being propagated comprising a series resistance and a shunt resistance spaced one-quarter wave-length apart.

22. In a wave guide system, a metallic pipe guide, means for attenuating the waves being propagated, said means comprising a series resistance and a shunt resistance spaced one-quarter wave-length apart, followed by a second series resistance spaced one-quarter wave-length from the shunt resistance.

23. In a wave guide system, a wave guide consisting of a hollow metallic pipe, attenuating means comprising series and shunt resistance inserted physically in the guide and adjusted to give desired attenuation and a metallic shield enclosing the said means.

24. In a high frequency electromagnetic wave transmission system, a wave guide and means for terminating said guide in its characteristic impedance comprising two impedance elements $Z_1$ and $Z_2$ spaced along the guide in accordance with the relation $$\tan \frac{2\pi l}{\lambda} = \frac{R_p + R_q}{X_q - X_p} = \frac{X_p + X_q}{R_p - R_q - Z_o}$$

where $l$ is the distance between said impedance elements, $\lambda$ is the wave-length, $R_p$ and $X_p$ are the resistance and reactance, respectively, of $Z_1$, $R_q$ and $X_q$ are the resistance and reactance, respectively, of $Z_2$, and $Z_o$ is the characteristic impedance of said guide.

25. A wave guide carrying high frequency electromagnetic waves and a plurality of resistive impedances so spaced apart along said guide as to match the impedance of said guide for at least one direction of wave propagation.

26. In combination with a wave guide comprising a metallic pipe for the transmission of electromagnetic waves at frequencies lying above a cut-off frequency, means for attenuating said waves comprising a plurality of resistive impedances spaced apart along said guide, the spacing interval between said impedances being simply related to the wave-length of said waves and the magnitudes of said impedances being such that the input impedance of the said attenuating means is substantially matched with the impedance of said guide.

SERGEI A. SCHELKUNOFF.